(12) United States Patent
Su et al.

(10) Patent No.: US 11,642,840 B2
(45) Date of Patent: May 9, 2023

(54) COMPOSITE MATERIAL LAYER AND METHOD FOR MANUFACTURING THE SAME

(71) Applicant: National Taipei University of Technology, Taipei (TW)

(72) Inventors: Cherng-Yuh Su, Taipei (TW);
Kai-Han Su, Chiayi (TW);
Chung-Chieh Chang, Taichung (TW);
Yung-En Liao, Yunlin County (TW);
Deng-Nan Jhang, New Taipei (TW);
Jia-Long Hu, Kaohsiung (TW)

(73) Assignee: National Taipei University of Technology, Taipei (TW)

( * ) Notice: Subject to any disclaimer, the term of this patent is extended or adjusted under 35 U.S.C. 154(b) by 9 days.

(21) Appl. No.: 17/314,068

(22) Filed: May 7, 2021

(65) Prior Publication Data
US 2021/0347112 A1 Nov. 11, 2021

(30) Foreign Application Priority Data
May 8, 2020 (TW) .......................... TW109115452

(51) Int. Cl.
*B29C 64/153* (2017.01)
*B33Y 10/00* (2015.01)
(Continued)

(52) U.S. Cl.
CPC ........ *B29C 64/153* (2017.08); *B29C 35/0805* (2013.01); *B29C 44/02* (2013.01); *B29C 44/04* (2013.01); *B29C 44/3461* (2013.01); *B29C 44/56* (2013.01); *B29C 67/20* (2013.01); *B33Y 10/00* (2014.12); *B33Y 30/00* (2014.12); *B33Y 70/10* (2020.01); *C08J 9/232* (2013.01); *C08K 3/04* (2013.01); *B29B 2009/163* (2013.01);
(Continued)

(58) Field of Classification Search
CPC ............ B29B 2009/163; B29C 64/153; B29C 35/0805; B29C 35/0866; B29C 2035/0811–0861; B29C 2035/0872–0883; B29C 67/20; B29C 44/02; B29C 44/04; B29C 44/0461; B29C 44/3415; B29C 44/3461; B29C 44/56; C08J 3/126; C08J 9/232; C08J 9/236
See application file for complete search history.

(56) References Cited

U.S. PATENT DOCUMENTS

2014/0358273 A1* 12/2014 LaBossiere ........... B29C 64/118
700/119
2015/0038605 A1 2/2015 Baghdadi
(Continued)

FOREIGN PATENT DOCUMENTS

CN 105451956 3/2016
CN 110126171 8/2019
(Continued)

*Primary Examiner* — Mary Lynn F Theisen
(74) *Attorney, Agent, or Firm* — JCIPRNET

(57) ABSTRACT

The present disclosure provides a composite material layer including a core layer and a shell layer. The core layer includes foamed elastomers. The shell layer encapsulates the core layer and continuously covered surfaces of the foamed elastomers, wherein the shell layer includes a material having light absorption. The melting point of the core layer is higher than the melting point of the shell layer.

11 Claims, 4 Drawing Sheets

(51) Int. Cl.
  *B29C 44/04*    (2006.01)
  *B29C 44/02*    (2006.01)
  *B29C 44/34*    (2006.01)
  *B29C 67/20*    (2006.01)
  *C08J 9/232*    (2006.01)
  *B29C 44/56*    (2006.01)
  *B29B 9/16*     (2006.01)
  *B33Y 70/10*    (2020.01)
  *B33Y 30/00*    (2015.01)
  *B29C 35/08*    (2006.01)
  *C08K 3/04*     (2006.01)
  *B33Y 80/00*    (2015.01)
  *B29L 31/50*    (2006.01)
  *B29K 75/00*    (2006.01)

(52) U.S. Cl.
  CPC .................. *B29C 2035/0822* (2013.01); *B29C 2035/0827* (2013.01); *B29C 2035/0838* (2013.01); *B29K 2075/00* (2013.01); *B29L 2031/504* (2013.01); *B33Y 80/00* (2014.12)

(56) References Cited

U.S. PATENT DOCUMENTS

2022/0025210 A1*  1/2022  Dippel ................... C09D 7/70
2022/0347896 A1*  11/2022 Seitner ................... B29C 44/22

FOREIGN PATENT DOCUMENTS

TW    201536853    10/2015
TW    201938347    10/2019

* cited by examiner

COMPOSITE MATERIAL LAYER AND METHOD FOR MANUFACTURING THE SAME

CROSS-REFERENCE TO RELATED APPLICATION

This application claims the priority benefit of Taiwan application Ser. No. 109115452, filed on May 8, 2020. The entirety of the above-mentioned patent application is hereby incorporated by reference herein and made a part of this specification.

BACKGROUND

Field of the Invention

The invention relates to a composite material layer and a method for manufacturing the same, and more particularly, to a composite material layer having a core-shell structure and a method for manufacturing the same.

Description of Related Art

Selective laser sintering (SLS) is a 3D printing technique, which is mainly used principles of accurately positioning a location for irradiating laser and performing a high-temperature sintering process on a powder under laser irradiation to sinter the powder layer by layer for accumulation modeling. Recently, a powder for manufacturing a shoe body by SLS technique is a non-foamed material. As a result, it has problems such as heavier weight and lack of elasticity.

SUMMARY

The present invention provides a composite material layer and a method for manufacturing the same. The composite material exhibits lightweight and has good mechanical strength and elasticity.

An embodiment of the invention provides a composite material layer including a core layer and a shell layer. The core layer includes foamed elastomers. The shell layer encapsulates the core layer and continuously covered surfaces of the foamed elastomers, wherein the shell layer includes a material having light absorption. The melting point of the core layer is higher than the melting point of the shell layer.

According to an embodiment of the invention, the melting point of the core layer is greater than about 170° C., and the melting point of the shell layer is about 60° C. to about 110° C.

According to an embodiment of the invention, at least some of the foamed elastomers are spaced apart from each other.

According to an embodiment of the invention, the shell layer s located between the at least some of the foamed elastomers.

According to an embodiment of the invention, the material having the light absorption is capable of absorbing a light with a wavelength ranging from 193 nm to 10600 nm.

According to an embodiment of the invention, the material having the light absorption is capable of absorbing a laser.

According to an embodiment of the invention, the shell layer includes a first thermoplastic polyurethane, and the core layer includes a second thermoplastic polyurethane having a property different from the first thermoplastic polyurethane.

According to an embodiment of the invention, the shell layer comprises an additive containing a carbon black.

An embodiment of the invention provides a method for manufacturing a composite material layer including following steps: providing a solution containing a shell material, wherein the shell material includes a material having light absorption; mixing foamed elastomers to the solution uniformly; removing a solvent in the solution to obtain a composite powder, wherein the composite powder includes the foamed elastomers and a shell material layer encapsulating the foamed elastomers, and the melting points of the foamed elastomers are higher than the melting point of the shell material layer; and performing a sintering process to the composite powder to form a composite material layer. The shell material layer exhibits a fused state during the sintering process to connect the foamed elastomers, so that the composite material layer is formed to include a core layer constituted by the foamed elastomers and a shell layer encapsulating the core layer and continuously covering surfaces of the foamed elastomers.

According to an embodiment of the invention, the foamed elastomers do not exhibit a fused state during the sintering process.

According to an embodiment of the invention, the melting points of the foamed elastomers are greater than about 170° C., and the melting point of the shell material layer is about 60° C. to about 110° C.

According to an embodiment of the invention, the material having the light absorption is capable of absorbing a light with a wavelength ranging from 193 nm to 10600 nm.

According to an embodiment of the invention, the sintering process includes a laser sintering process.

According to an embodiment of the invention, the shell layer includes a first thermoplastic polyurethane, and the core layer includes a second thermoplastic polyurethane having a property different from the first thermoplastic polyurethane.

According to an embodiment of the invention, the core layer includes a thermoplastic polyurethane, and the shell layer includes a thermoplastic polymer other than the thermoplastic polyurethane.

According to an embodiment of the invention, the method further comprises a step of adding an additive containing a carbon black to the solution before mixing foamed elastomers to the solution uniformly.

According to an embodiment of the invention, the method further comprises a step of performing a thermal treatment process to the composite material layer after performing the sintering process to the composite powder.

Based on the above, in the composite material layer and the method for manufacturing the same, since the melting points of the foamed elastomers are higher than the melting point of the shell material layer, the shell material layer can exhibit a fused state to bind the foamed elastomers during the sintering process. As such, the adhesion results between the foamed elastomers can be improved, thereby improving the tensile property of the composite material layer. On the other hands, the foamed elastomers of the core layer can still retain the foamed porous structure after the sintering process, so that the composite material layer has effects such as light weight, good elasticity, and good energy absorption.

DESCRIPTION OF THE EMBODIMENTS

Figure 1:
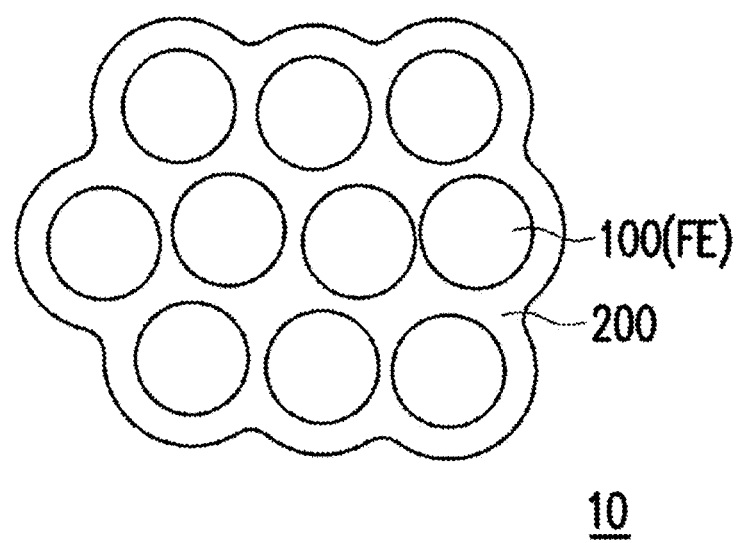
FIG. 1 is a schematic diagram of the composite material layer of an embodiment of the present invention.

The invention will be described more comprehensively below with reference to the drawings for the embodiments. However, the invention may also be implemented in different forms rather than being limited by the embodiments described in the invention. Thicknesses of layer and region in the drawings would be enlarged for clarity. The same or similar reference numerals are used in the drawings and the description to indicate the same or similar elements, which are not repeated in the following embodiments.

It will be understood that when an element is referred to as being "on" or "connected" to another element, it may be directly on or connected to the other element or intervening elements may be present. If an element is referred to as being "directly on" or "directly connected" to another element, there are no intervening elements present. As used herein, "connection" may refer to both physical and/or electrical connections, and "electrical connection" or "coupling" may refer to the presence of other elements between two elements. As used herein, "electrical connection" may refer to the concept including a physical connection (e.g., wired connection) and a physical disconnection (e.g., wireless connection).

As used herein, "about", "approximately" or "substantially" includes the values as mentioned and the average values within the range of acceptable deviations that can be determined by those of ordinary skill in the art. Consider to the specific amount of errors related to the measurements (i.e., the limitations of the measurement system), the meaning of "about" may be, for example, referred to a value within one or more standard deviations of the value, or within ±30%, ±20%, ±10%, ±5%. Furthermore, the "about", "approximate" or "substantially" used herein may be based on the optical property, etching property or other properties to select a more acceptable deviation range or standard deviation, but may not apply one standard deviation to all properties.

The terms used herein are used to merely describe exemplary embodiments and are not used to limit the present disclosure. In this case, unless indicated in the context specifically, otherwise the singular forms include the plural forms.

FIG. 1 is a schematic diagram of the composite material layer of an embodiment of the present invention.

Referring to FIG. 1, a composite material layer 10 includes a core layer 100 and a shell layer 200. The core layer 100 may include foamed elastomers FEs, and the shell layer 200 may continuously cover surfaces of the foamed elastomers FEs to encapsulate the core layer 100. In this embodiment, at least some of the foamed elastomers FEs are space apart from each other. As such, the shell layer 200 can also position between the foamed elastomers FEs that are space apart from each other. In some embodiments, at least some of the foamed elastomers FEs may space apart from each other, and at least some other of the foamed elastomers FEs may be in contact with each other.

In this embodiment, the shell layer 200 may include a first thermoplastic polyurethane (TPU), and the core layer 100 may include a second TPU whose property is different from the first TPU. As such, the composite material layer can achieve specific properties by combining two or more of different types of base materials to break the limitations of single base material, and can apply to different industries to further improve the performance of the final products of these industries.

In some embodiments, the shell layer 200 may include the APU-32-80B type TPU; and the core layer 100 may include A12 type TPU having a property different from the APU-32-80B type TPU. In some alternative embodiments, the core layer 100 may include the A12 type TPU, and the shell layer 200 may include a polymethyl methacrylate (PMMA) whose properties different from the A12 type TPU. In some other embodiments, the material of the shell layer 200 can be selected from the following materials according to different applications: polyamide (PA), polyethylene (PE), polypropylene (PP), polyether ether ketone (PEEK), polycaprolactone (PCL), polycarbonate (PC), polystyrene (PS), acrylonitrile-butadiene-styrene copolymer (ABS), polyvinyl chloride (PVC), or a combination thereof. On the other hands, the material of the core layer 100 can be selected from the following group according to different applications: ethylene-vinyl acetate copolymer (EVA), polystyrene (PS), polycarbonate (PC), polyurethane (PU), Nylon, chloroprene rubber (CR), polyoxymethylene (POM), styrene butadiene rubber (SBR), PP, nitrile butadiene rubber (NBR), ethylene-propylene-diene monomer(EPDM), polyvinyl chloride (PVC), acrylonitrile-butadiene-styrene copolymer (ABS), polyethylene (PE), polymethyl methacrylate (PMMA), or a combination thereof.

In this embodiment, the shell layer 200 may include a material having light absorption. For example, the shell layer 200 may include a material that is capable of absorbing a light with a wavelength ranging from 193 nm to 10600 nm. In this embodiment, the shell layer 200 is capable of absorbing a laser, such as ArF laser or $CO_2$ laser.

In this embodiment, the melting point of the core layer 100 may be higher than the melting point of the shell layer 200. As such, the foamed elastomers FEs can still retain the foamed porous structure after the sintering process, so that the composite material layer 10 is capable of having effects such as light weight, good elasticity, and good energy absorption. For example, the melting point of the core layer 100 may be greater than about 170° C., and the melting point of the shell layer 200 may be about 60° C. to about 110° C.

In some embodiments, the shell layer 200 may be selectively include an additive containing a carbon black to improve the mechanical properties of the composite material layer 10. In some other embodiments, in addition to the carbon black, the following materials may also be selected as additives according to the applications: carbon nanotube (CNT), graphite, carbon fiber, aluminum nitride (AlN), boron nitride (BN), gold (Au), Silver (Ag), copper (Cu), nickel (Ni), aluminum oxide ($Al_2O_3$), titanium oxide ($TiO_2$), tin oxide ($SnO_2$), zinc oxide (ZnO), silicon dioxide ($SiO_2$), or a combination thereof. For example, at least one of the carbon black, carbon fiber, graphite, and silicon dioxide can be added as an additive to the shell layer 200 whose material is TPU (e.g., APU-32-80B type TPU). Alternatively, boron nitride can be added as an additive to the shell layer 200 whose material is PMMA.

Figure 2:
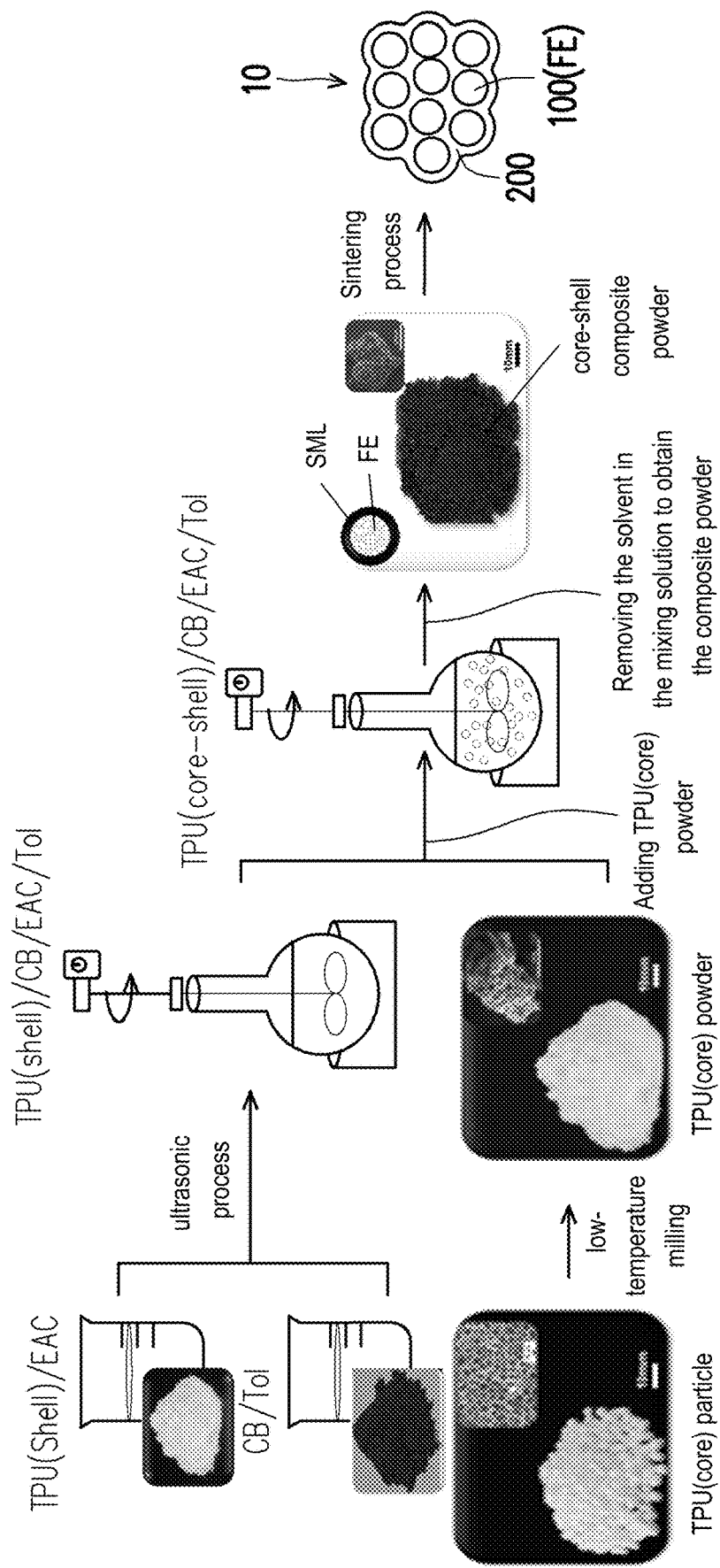
FIG. 2 is a schematic diagram of the method for manufacturing the composite material layer of an embodiment of the present invention.

FIG. 2 is a schematic diagram of the method for manufacturing the composite material layer of an embodiment of the present invention.

Firstly, with reference to FIG. 2, a solution containing a shell material having a material with light absorption is provided. For example, the shell material may be the first TPU (being presented as TPU (shell) in FIG. 2). The APU-32-80B type TPU may be used as the first TPU for instance, and the solution may be selected according to the shell material. For example, when the APU-32-80B type TPU is used as the first TPU, the ethyl acetate (EAC) can be selected as the solution. In this embodiment, the material with light absorption described above is, for example, capable of absorbing a light with wavelength ranging from 193 nm to 10600 nm. In some other embodiments, the shell material can be selected from the following materials according to different applications: polyamide (PA), polyethylene (PE), polypropylene (PP), polyether ether ketone (PEEK), polycaprolactone (PCL), polycarbonate (PC), polystyrene (PS), acrylonitrile-butadiene-styrene copolymer (ABS), polyvinyl chloride (PVC), or a combination thereof.

Next, foamed elastomers (being presented as TPU (core) powder in FIG. 2) is mixed to the above solution uniformly. In some embodiments, the foamed elastomers may be, for example, manufactured by following steps. Firstly, a second TPU having a property different from the first TPU is used as a raw particle to subject a foaming process to form the foamed second TPU (being presented as TPU (core) particles in FIG. 2). After that, the foamed second TPU particles are subjected a low-temperature milling process to form the foamed elastomers. In some embodiments, after subjecting the low-temperature milling process, a sieving machine can be used to control the particle size of the foamed elastomers. In some other embodiments, the foamed elastomers can be selected from the following materials according to different applications: ethylene-acetic acid ethylene copolymer (EVA), polystyrene (PS), polycarbonate (PC), polyurethane (PU), nylon (Nylon), chloroprene rubber (CR), polyoxymethylene (POM), styrene butadiene rubber (SBR), polypropylene (PP), nitrile butadiene rubber (NBR), ethylene-propylene-diene monomer (EPDM), polyvinyl chloride (PVC), acrylonitrile-butadiene-styrene copolymer (ABS), Polyethylene (PE), polymethyl methacrylate (PMMA), or a combination thereof.

In some embodiments, as shown in FIG. 2, the method for manufacturing the composite material layer may further include a step of adding other additives to the solution before the foamed elastomers is mixed to the solution uniformly. The additives may be inorganic additives, organic additives, or a combination thereof. For example, the additive may be an additive containing a carbon black, which is, for example, added to the solution by the following steps. Firstly, a carbon black (CB) powder is dispersed in a toluene (Tol) to prepare the additive containing the carbon black. Then, the additive containing the carbon black us added to the solution containing the shell material. For example, the carbon black dispersed in the toluene is added to the ethyl acetate (EAC) containing the APU-32-80B type TPU and then stirs to obtain a colloid solution with uniform dispersion (being presented as TPU (shell)/CB/EAC/Tol in FIG. 2). After that, as described above, the foamed elastomers (being presented as TPU (core) powder in FIG. 2) are mixed to the colloid solution to form a mixing solution (being presented as TPU (core-shell)/CB/EAC/Tol in FIG. 2).

In some other embodiments, in addition to the carbon black, the following materials can be selected as additives according to the applications: carbon nanotube (CNT), graphite, carbon fiber, aluminum nitride (AlN), boron nitride (BN), gold (Au), silver (Ag), copper (Cu), nickel (Ni), aluminum oxide ($Al_2O_3$), titanium oxide ($TiO_2$), tin oxide ($SnO_2$), zinc oxide (ZnO), silicon dioxide ($SiO_2$), or a combination thereof.

Figure 3C:
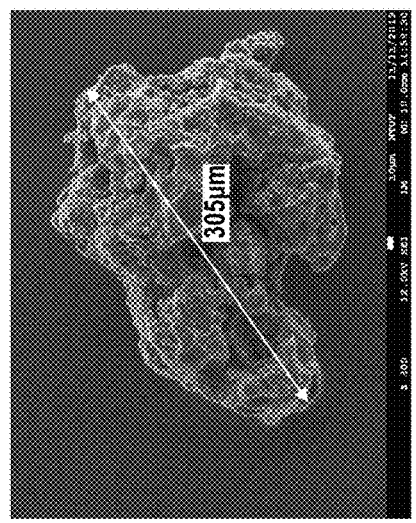
FIG. 3C is a SEM image of the composite powder of an embodiment of the present invention.

Then, the solvent in the above mixing solution is removed to obtain composite powders (the surface morphology is shown in FIG. 3C). In this embodiment, the composite powders may include the foamed elastomers FEs and shell material layers SML encapsulating the foamed elastomers FEs. In other words, the composite powders may be core-shell composite powders, in which the foamed elastomers FEs may constitute core layers of the core-shell composite powders, and the shell material layers SML may constitute shell layers of the core-shell composite powders. In some embodiments, the solvent in the mixing solution may be removed by placing the mixing solution in a vacuum oven at 70° C. for 24 hours, but the invention is not limited thereto.

After that, the composite powders are subjected a sintering process to form a composite material layer 10. In this embodiment, the shell material layer SML exhibits a fused state during the sintering process to bind the foamed elastomers FEs, so that the composite material layer 10 is formed to include the core layer 100 constituted by the foamed elastomers FEs and the shell layer 200 continuously covering surfaces of the foamed elastomers FEs to encapsulate the core layer 100. In this embodiment, a laser sintering process may be adopted to perform the sintering process as described above. For example, a selectivity laser sintering (SLS) may be adopted to perform the sintering process as described above. In this embodiment, the property of the first TPU that uses as the shell material is different from the property of the second TPU that uses in the foamed elastomers. For example, the melting point of the second TPU is higher than that of the first TPU, that is, the melting points of the foamed elastomers FEs are higher than the melting point of the shell material layer SML. As such, the shell material layer SML can exhibit the fused state and bind the foamed elastomers FEs during the sintering process, so that the adhesion results between the foamed elastomers FEs can be improved, thereby improving the tensile property of the composite material layer 10, and the core layer 100 constituted by the foamed elastomers FEs would not be melted (e.g., the fused state is not exhibited) and retains the foamed porous structure to make the composite material layer 10 have effects such as light weight, good elasticity, and good energy absorption. For example, when the composite material layer 10 is applied to the materials of soles, the weight of the soles can be reduced by about 63% as compared to soles formed by the general fused deposition molding (FDM) technique. Also, the time required to manufacture the soles is reduced dramatically.

Alternatively, in the SLS process adopted above, the energy density of the laser can be adjusted to subject the SLS process only on the shell material layers SML of the composite powders or only on portions of the shell material layers SML of the composite powders, and the foamed elastomers FEs in the composite powders would not be affected by the SLS process, or only surfaces of the foamed elastomers FE would be slightly affected by the SLS process. In this case, materials of the foamed elastomers FEs may also be selected from the materials with melting points lower than the melting point of the shell material layer SML.

In some embodiments, the melting points of the foamed elastomers FEs may be greater than about 170° C.; and the melting point of the shell material layer SML may be about 60° C. to about 110° C. In the above embodiments of adding the carbon black, the carbon black can be added to the shell material layer SML to improve the thermal stability of the composite powder, thereby increasing the temperature margin in the subsequent sintering process. In addition, in the aforementioned embodiments of adding the carbon black, the composite material layer formed after subjecting the sintering process in subsequent can have improved mechanical properties by adding the carbon black to the shell layer 200.

In some embodiments, an additional thermal treatment process may be selectively performed on the composite material layer after the sintering process is performed on the composite powders so as to further improve the tensile property of the composite material layer 100. For example, since the SLS process is a selective sintering process for the composite powders, the composite powders may still have non-sintered portions. Therefore, the non-sintered portions in the composite powders may exhibit the fused state by subjecting the additional thermal treatment process, so that the adhesion results between the foamed elastomers can be further improved to make the composite material layer have better tensile property. In this embodiment, the temperature of the thermal treatment may be 150° C., and the time for thermal treatment may be 5 hours. In some other embodiments, the temperature and time of the thermal treatment may be adjusted according to the design as long as the non-sintered portions can exhibit the fused state and the warpage cause by the over-melting would not generate on the composite material layer.

Hereinafter, the features of present invention will be described in more detail with reference to Embodiments 1 to 6 and Comparative Embodiments 1 to 3. Although the following embodiments are described, under the circumstance that does not exceed the scope of the present invention, the materials, its amount and ratio, treatment details, treatment processes, and the like may be changed appropriately. as a result, the embodiment described below should not restrict the interpretation of present invention.

Embodiment 1

[Foamed Elastomers]

Figure 3B:
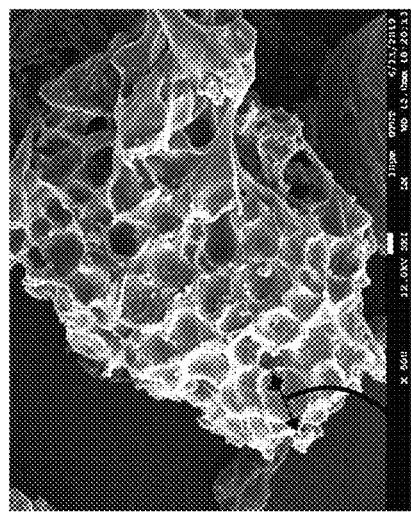
FIG. 3B is a SEM image of the A12 type TPU subjecting the foaming process.
Figure 3A:
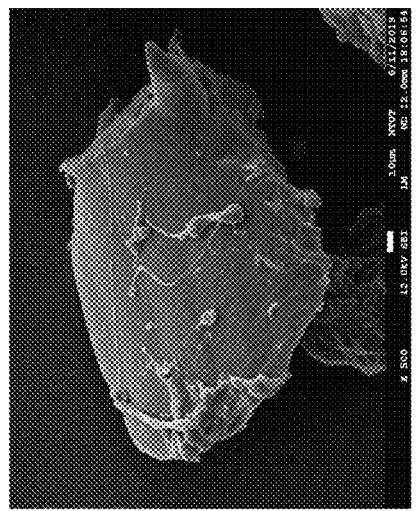
FIG. 3A is a scanning electron microscope (SEM) image of the A12 type thermoplastic polyurethane (TPU) without subjecting a foaming process.

Firstly, an A12 type TPU (hereinafter, TPU (core)) was used as the raw particles and placed in a foaming tank. Next, the TPU (core) was immersed in a supercritical $CO_2$ fluid with temperature and pressure at 140° C. and 200 kgf/cm², respectively, for 0.5 hours to achieve solubility equilibrium. Then, the pressure was reduced to atmospheric pressure, so that the foamed pores were formed and grown in the matrix to form foamed TPU (core) particles. Then, the foamed TPU (core) particles were immersed in a liquid nitrogen for a low-temperature milling to form foamed elastomers. After that, the particle sizes of the foamed elastomers were controlled at about 0.297 mm by a powder sieving machine. FIG. 3A is a SEM image of the A12 type TPU without subjecting a foaming process. FIG. 3B is a SEM image of the A12 type TPU subjecting the foaming process. Referring to FIGS. 3A and 3B, the surfaces of the TPU (core) can generate foamed pores after the TPU (core) was subjected the foaming process, and the pore sizes of the foamed pores may be about 15±5 μm.

[Solution Containing Shell Material]

Firstly, an APU-32-80B type TPU (hereinafter, TPU (shell)) was dispersed in an ethyl acetate solution, and a carbon black powder was dispersed in a toluene solution. Next, the toluene solution containing the carbon black powder was added to the ethyl acetate solution containing the TPU (shell), and then stirred for about 10 minutes by a disperser (a T25 digital disperser manufactured by IKA Works from Germany) to obtain a uniformly dispersed solution containing the shell material (i.e., TPU (shell)/carbon black/ethyl acetate/toluene).

[Core-Shell Foamed Composite Powder]

The above foamed elastomers were added to the above solution containing the shell material, and then poured into a container (such as Tellon™ well plate) after well mixing, After that, the mixing solution was dried in a vacuum oven at 70° C. for 24 hours to remove the solvent, so that a core-shell foamed composite powder was obtained after drying. FIG. 3C is a SEM image of the composite powder of an embodiment of the present invention, Referring to FIGS. 3B and 3C, the shell layer containing the carbon black is well encapsulated the foamed elastomers to form the core-shell foamed composite powder.

[Composite Material Layer]

SLS process was performed on the above core-shell foamed composite powder to form a composite material layer of Embodiment 1. The energy density of the laser used in the SLS process was 72 kJ/m². A dioxide laser was used in the SLS process, and the energy density (E) of the laser can be obtained by the following formula 1:

$$E = \frac{P}{vS} \qquad \text{[Formula 1]}$$

In formula 1, P is laser power (W), v is scanning velocity (mm/s), and S is scanning spacing (mm).

Embodiment 2

Except for replacing the energy density of the laser in the SLS process to 96 kJ/m², the composite material layer of Embodiment 2 was formed in the same manner as in the composite material layer of Embodiment 1.

Embodiment 3

Except for replacing the energy density of the laser in the SLS process to 120 kJ/m², the composite material layer of Embodiment 3 was formed in the same manner as in the composite material layer of Embodiment 1.

Embodiment 4

An additional thermal treatment process was conducted to the composite material layer of Embodiment 1 to form a composite material layer of Embodiment 4. The temperature and time of the thermal treatment process was 150° C. and 5 hours, respectively.

Embodiment 5

An additional thermal treatment process was conducted to the composite material layer of Embodiment 2 to form a composite material layer of Embodiment 5. The temperature and the time of the thermal treatment process was 150° C. and 5 hours, respectively.

Embodiment 6

An additional thermal treatment process was conducted to the composite material layer of Embodiment 3 to form a composite material layer of Embodiment 6. The temperature and the time of the thermal treatment process was 150° C. and 5 hours, respectively.

Embodiment 7

Except for replacing the energy density of the laser in the SLS process to 84 kJ/m² and replacing the carbon black to a carbon fiber, the composite material layer of Embodiment 7 was formed in the same manner as in the composite material layer of Embodiment 4.

Embodiment 8

Except for replacing the A12 type TPU (i.e., TPU (core)) to the A13 type TPU, replacing the energy density of the laser in the SLS process to 84 kJ/m², and replacing the carbon black to a carbon fiber, the composite material layer of Embodiment 8 was formed in the same manner as in the composite material layer of Embodiment 4.

Comparative Embodiment 1

Figure 4:
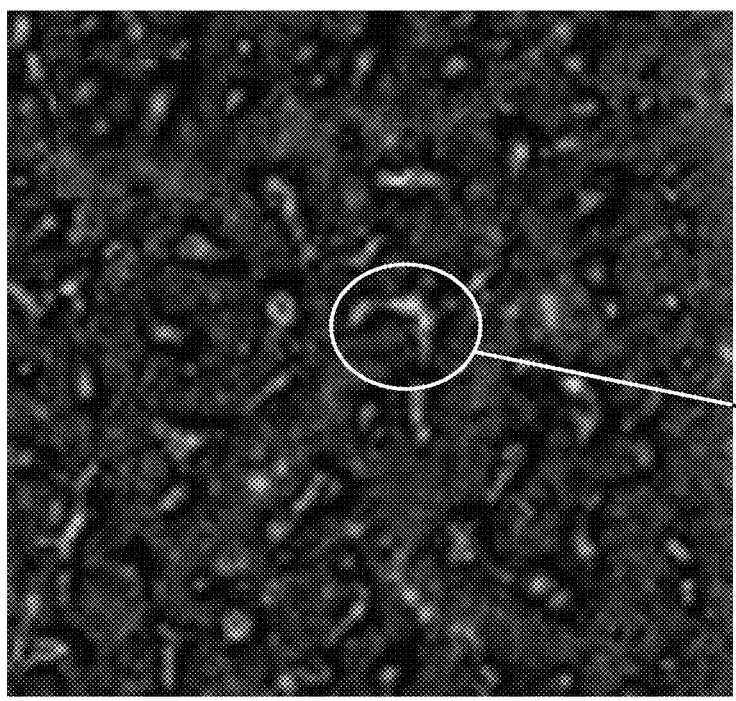
FIG. 4 is an optical microscope image of the Comparative Embodiment 1.

Except for replacing the energy density of the laser in the SLS process to 150 kJ/m² the composite material layer of the Comparative Embodiment 1 was formed in the same manner as in the composite material layer of Embodiment 1. FIG. 4 is an optical microscope image of the Comparative Embodiment 1. From FIG. 4, under the circumstance that the energy density of the laser is too high, the warpage, as shown in FIG. 4, cause by the over-melting would generate.

Comparative Embodiment 2

Foamed elastomers were formed in the same manner as in the Embodiment 1. Then, the foamed elastomers were mixed with the carbon black in a solid-state mixing manner to obtain a foamed composite powder. After that, the SLS process was performed on the above foamed composite powder to form a composite material layer of Comparative Embodiment 2. The energy density of the laser used in the SLS process was 120 kJ/m².

Comparative Embodiment 3

An additional thermal treatment process was conducted to the composite material layer of Comparative Embodiment 2 to form a composite material layer of Comparative Embodiment 3. The temperature and time of the thermal treatment process was 150° C. and 5 hours, respectively.

Reference Embodiment 1

Reference Embodiment 1 is foamed elastomers that uses A12 type TPU (i.e., TPU (core)) as the raw particles and foaming by the same manner as described in Embodiment 1.

Reference Embodiment 2

Reference Embodiment 2 is foamed elastomers that uses A13 type TPU (i.e., TPU (core)) as the raw particles and foaming by the same manner as described in Embodiment 1.

Experiment 1

A tensile test analysis was conducted on Embodiments 1 to 6 and Comparative Embodiment 1 to study the relationship between the energy density of the laser and stress. The experimental results are arranged in the following Table 1.

TABLE 1

| | Energy density of laser (kJ/m²) | Thermal treatment process | Maximum tensile stress (MPa) |
| --- | --- | --- | --- |
| Embodiment 1 | 72 | — | 0.06 |
| Embodiment 2 | 96 | — | 0.24 |
| Embodiment 3 | 120 | — | 0.43 |
| Embodiment 4 | 72 | ○ | 0.19 |
| Embodiment 5 | 96 | ○ | 0.46 |
| Embodiment 6 | 120 | ○ | 0.78 |
| Comparative Embodiment 1 | 150 | — | — |

It can be seen from Table 1 that as the energy density of the laser increases, the fused effect of the shell layer in the core-shell foamed composite powder is better, so that the binding strength between the foamed elastomers in the core-shell foamed composite powder is better, and the composite material layer formed thereof has well tensile strength. However, in the case where the energy density of the laser is too high, such as the composite material layer of Comparative Embodiment 1, the composite material layer would generate a thermal warpage phenomenon caused by over-melting as shown in FIG. 4. As such, the composite material layer of Comparative Embodiment 1 does no conduct an additional thermal treatment process and a tensile test. On the other hands, the additional thermal treatment process can further improve the tensile strength of the composite material layer.

Experiment 2

Based on the result presented in the above Experiment 1, another tensile test analysis was performed on the Embodiments 3 and 6 and the Comparative Embodiments 2 and 3, which the energy density of the laser was conducted at 120 kJ/m², to compare the stress and strain of the Embodiments 3 and 6 and the Comparative Embodiments 2 and 3. The experimental results are arranged in the following Table 2.

TABLE 2

| | Thermal treatment process | Maximum tensile stress (MPa) | Elongation (%) |
| --- | --- | --- | --- |
| Embodiment 3 | — | 0.43 | 119 |
| Embodiment 6 | ○ | 0.78 | 203 |
| Comparative Embodiment 2 | — | 0.5 | 84 |
| Comparative Embodiment 3 | ○ | 0.6 | 84 |

It can be seen from Table 2 that the Embodiments 3 and 6 have better elongation as compared to the Comparative Embodiments 2 and 3.

Experiment 3

The tensile test analysis was conducted on the Embodiments 7 and 8 and the Reference Embodiments 1 and 2. The experimental results are arranged in the following Table 3.

The tensile test analysis was performed on the Embodiments 7 and 8 and the Reference Embodiments 1 and 2, which the energy density of the laser was conducted at 84 kJ/m², to compare the stress and strain of the Embodiments 7 and 8 and the Reference Embodiments 1 and 2. The experimental results are arranged in the following Table 3.

TABLE 3

| | Heat treatment process | Maximum tensile stress (MPa) | Elongation (%) |
|---|---|---|---|
| Embodiment 7 | ○ | 1.74 | 162.3 |
| Embodiment 8 | ○ | 5.75 | 479.5 |
| Reference Embodiment 1 | — | 0.57 | 155.4 |
| Reference Embodiment 2 | — | 4.88 | 441.1 |

It can be seen from Table 3 that the composite material layer of Embodiment 7 has improved tensile stress and elongation as compared to the foamed elastomers of Reference Embodiment 1. On the other hands, the composite material layer of Embodiment 8 has improved tensile stress and elongation as compared to the foamed elastomers of Reference Embodiment 2.

In summary, in an embodiment of the composite material layer and the method for manufacturing the same, since the melting points of the foamed elastomers are higher than the melting point of the shell material layer, the shell material layer can exhibit a fused state to bind the foamed elastomers during the sintering process. As such, the adhesion results between the foamed elastomers can be improved, thereby improving the tensile property of the composite material layer. On the other hands, the foamed elastomers of the core layer can still retain the foamed porous structure after the sintering process, so that the composite material layer has effects such as light weight, good elasticity, and good energy absorption.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for manufacturing a composite material layer, comprising:
   providing a solution containing a shell material, wherein the shell material comprises a material having light absorption;
   mixing foamed elastomers to the solution uniformly;
   removing a solvent in the solution to obtain a composite powder, wherein the composite powder comprises the foamed elastomers and a shell material layer encapsulating the foamed elastomers, and melting points of the foamed elastomers are higher than a melting point of the shell material layer; and
   performing a sintering process to the composite powder to form a composite material layer,
   wherein the shell material layer exhibits a fused state during the sintering process to bind the foamed elastomers, so that the composite material layer is formed to comprise a core layer constituted by the foamed elastomers and a shell layer encapsulating the core layer and continuously covering surfaces of the foamed elastomers,
   a material of the core layer is selected from the group consisting of ethylene-vinyl acetate copolymer, polystyrene, polycarbonate, polyurethane, nylon, chloroprene rubber, polyoxymethylene, styrene butadiene rubber, polypropylene, nitrile butadiene rubber, ethylene-propyl ene-diene monomer, polyvinyl chloride, acrylonitrile-butadiene-styrene copolymer, polyethylene, polymethyl methacrylate, and a combination thereof.

2. The method for manufacturing the composite material layer according to claim 1, wherein the foamed elastomers do not exhibit a fused state during the sintering process.

3. The method for manufacturing the composite material layer according to claim 1, wherein the melting points of the foamed elastomers are greater than about 170° C., and the melting point of the shell material layer is about 60° C. to about 110° C.

4. The method for manufacturing the composite material layer according to claim 1, wherein the material having the light absorption is capable of absorbing a light with a wavelength ranging from 193 nm to 10600 nm.

5. The method for manufacturing the composite material layer according to claim 1, wherein the sintering process comprises a laser sintering process.

6. The method for manufacturing the composite material layer according to claim 1, wherein the shell layer comprises a first thermoplastic polyurethane, and the core layer comprises a second thermoplastic polyurethane having a property different from the first thermoplastic polyurethane.

7. The method for manufacturing the composite material layer according to claim 1, wherein the core layer comprises a thermoplastic polyurethane, and the shell layer comprises a thermoplastic polymer other than the thermoplastic polyurethane.

8. The method for manufacturing the composite material layer according to claim 1, further comprising:
   adding an additive containing a carbon black to the solution before mixing foamed elastomers to the solution uniformly.

9. The method for manufacturing the composite material layer according to claim 1, further comprising:
   performing a thermal treatment process to the composite material layer after performing the sintering process to the composite powder.

10. The method for manufacturing the composite material layer according to claim 5, wherein an energy density of a laser used in the laser sintering process is 72~120 kJ/m².

11. The method for manufacturing the composite material layer according to claim 9, wherein a temperature of the thermal treatment process is 150° C., and a time for the thermal treatment process is 5 hours.

* * * * *